Aug. 21, 1951 — D. G. HILL, JR — 2,565,024
COOKING TIMING MACHINE.
Filed June 29, 1949 — 2 Sheets-Sheet 1

INVENTOR.
David G. Hill, Jr.
BY C. P. Goepel
his ATTORNEY

Aug. 21, 1951  D. G. HILL, JR  2,565,024
COOKING TIMING MACHINE
Filed June 29, 1949  2 Sheets-Sheet 2

INVENTOR.
David G. Hill, Jr.
BY
C. P. Goepel
his ATTORNEY

Patented Aug. 21, 1951

2,565,024

UNITED STATES PATENT OFFICE 2,565,024

COOKING TIMING MACHINE

David G. Hill, Jr., New Orleans, La.

Application June 29, 1949, Serial No. 101,989

2 Claims. (Cl. 161—1)

The invention relates to improvements in cooking timing machines in which a dial, pivotally mounted on the stem of a cut-off handle of a cooking stove, is manually turned against the resistance of a spring and meshed in the teeth of a ratchet-wheel of a clock-work mechanism, when manually released reverses its revolving movement and turns off the teeth of said ratchet-wheel and engages said cut-off handle stem, causing it to revolve until the heat emitting from the cooking element is extinguished; and the objects of the improvements are; first, to provide an automatic device which may be easily set in motion to extinguish the heat emitting from heating elements of a cooking stove in a predetermined length of time; second, to provide a device to automatically extinguish such heat at the termination of the desired time interval; and third, to provide a simple, inexpensive machine, which may be affixed to any one, or all cut-off handle stems, including for the ovens, of a cooking stove, either while it is in home use or as it is manufactured, and after having accomplished the extinguishment of said heat, will automatically disengage itself from the cut-off handle stem, so that manual operation of the cooking element handles may be resumed without interference from the cooking timing machine. The improved device automatically extinguishes the heat being applied to the food in a predetermined length of time, thereby allowing the cook full freedom to attend to other affairs with confidence that the heat will be automatically extinguished as desired.

The invention consists of a member engaging an escapement mechanism which member is engageable with or disengageable from another part of the timing device, whereby either time controlled operation is achieved or the heating means may be used without any time control, the controlling means when used shutting off the heating means.

The invention will be further described, an embodiment thereof shown in the drawings, and the invention will be finally pointed out in the claims.

In the accompanying drawings.

Similar characters of reference indicate corresponding parts throughout the various views.

Figure 1:
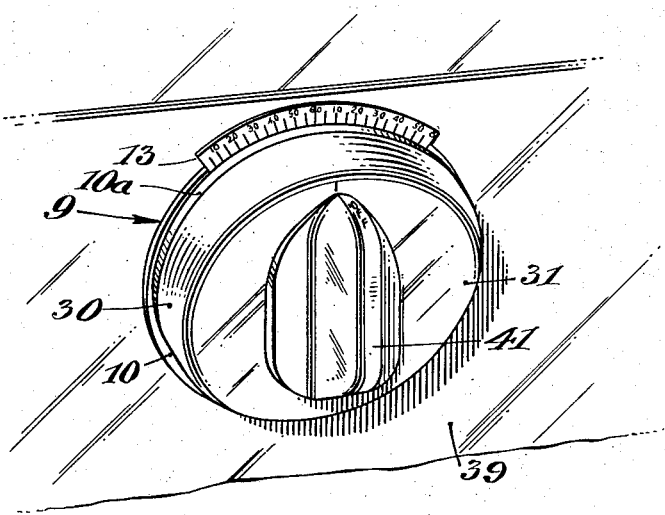
Fig. 1 is a perspective view of the device, mounted upon a gas stove.

Referring to the drawings, a stationary member 9 consists of a front flat portion 10 having a circumferential flange 10a at its perimeter. The member 10 has a central opening 13a, and has mounted at its front part, an escapement mechanism. The member 9 at its flat portion 10 is rigidly affixed to the cooking stove. The timing device is mounted on the shaft of a cut off handle of a cooking stove 39.

The actuation of the improved device applied to a cut off handle of a cooking stove is such that when certain parts thereof are held out of engagement with the shaft of the cut off handle, a resumption of manual operation of said cut off handle without interference from the cooking timing device is permitted. The cooking time device is mounted between the front panel of the stove and the cut off handle. Where the variations of the diameter of the shafts will not accommodate a part of the timing device of fixed diameter (collar 26) or the limited space between the front panel of the stove and the cut off handle will not receive the width of the timing device, a special cut off handle with a shaft of proper size and length to replace the one in use on the stove, is provided. Cooking timing devices produced for attachment to cooking stoves as the stoves are manufactured would be provided for in the design of the cut off handle shafts.

Disposed at the front of the member 9 is a plate 31 with a curved flange 30 at its rim projecting towards said member 9, and providing with a central opening 31a.

A coil spring 32 has one end secured to the member 9 by hooking through on a post 17 near the rim of the inner surface of the part 10 of the member 9, with the diametric lever projection 27 of said collar 26 positioned between the part 10 and the plate 31.

The post 17 is a pin affixed to the member 9 projecting through the brace 42 and is equipped with a longitudinal slot near its free end which receives and holds one crooked end of the spring 32, and its length is equal to the width of the space between the inner surface of the member 9 and the plate 31 when the segmental rack 34 is in engagement position with the teeth of the gear 11. The other end of the spring is secured to a projection 35 near the center of the inner surface of the plate 31. A segmental rack is arranged on the inner surface of the curved flange 30. A collar 26 with a radial arm 27 is provided, around which collar 26, between the member 9 at its flat portion 10, and said plate 31, is pivotally mounted.

The part 10 of the member 9 is rigidly affixed to the cooking stove by screws 10b with the collar 26 rigidly mounted around the shaft 25 by set screw 29 of the cut off handle 41 of the shaft 25 of the stove. When the plate 31 is manually rotated clockwise and then pushed, the teeth of the segmental rack mesh with the teeth of the gear 11 of the escapement mechanism. The projection 35 is fixed to the plate 31 and is provided with a slot which receives and holds the other hooked end of the spring 32, and is positioned in the path of the radial arm 27 of the collar 26, so that as the plate 31 continues to revolve after engagement with the gear 11, it strikes the radial arm 27 (see Fig. 2) rotating collar 26 until the heat emitting from the cooking element is extinguished. The collar 26 is rigidly fixed to the cut off handle shaft 25 by a set screw 29.

When the plate 31 has been pushed and rotated in one direction, the coil spring is then in a stretched or wound position, and when the plate 31 is manually released, the plate 31 is caused to rotate in the reverse direction actuating the escapement mechanism until the teeth on the segmental rack 34 work off the teeth of the gear 11. When the projection 35 affixed to the plate 31, strikes the radial arm 27 causing the collar 26 to rotate, the shaft 25 of the cut off valve is rotated, until the heat emitter of the cooking element is extinguished.

Figure 2:
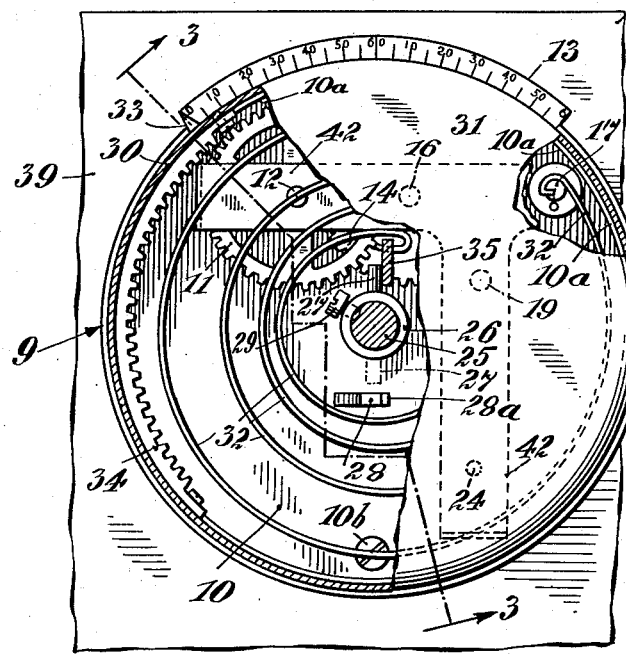
Fig. 2 is a front view partly broken away in the position ready to close the valve, taken on the line 2—2 of Fig. 3.
Figure 3:
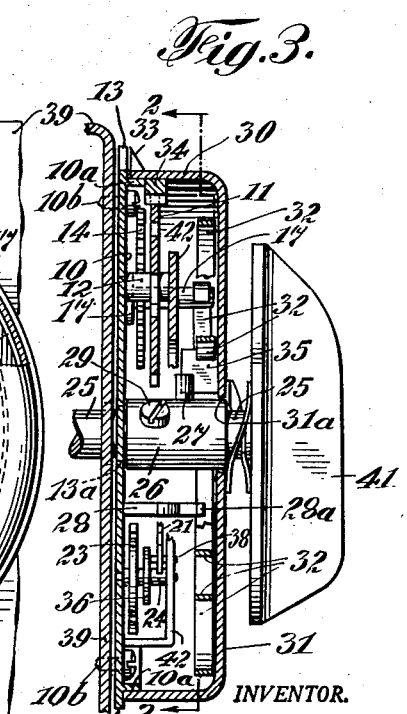
Fig. 3 is a section taken on the line 3—3 of Fig. 2.
Figure 4:
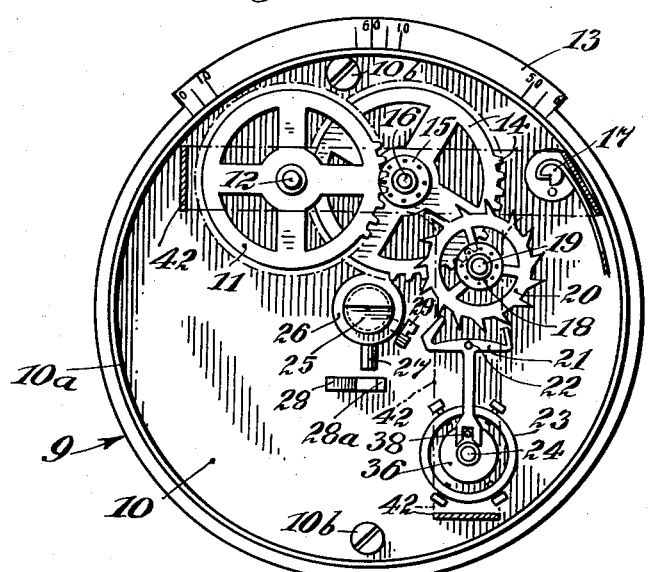
Fig. 4 shows the escapement mechanism mounted upon the stationary member.
Figure 5:
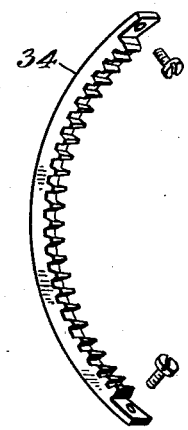
Fig. 5 is a perspective view of the segmental rack.

As illustrated in Fig. 2 of the drawings, the length of the teeth of the segmental rack 34 is more than twice as long as the teeth of the gear 11, but otherwise of the same dimension for one-half of their length, and then taper in height and thickness to their base at the point of contact with the gear 11, to facilitate meshing with the teeth of the gear.

In the clockwork mechanism, the chain of wheels, escapement lever 21 and the balance wheel 23 are mounted between the member 9 and the brace 42, on pin pointed axes 12, 16, 19, 22 and 24 fitted into cone shaped borings in the member 10 and brace 42. The gear 11 is positioned on the member 9 so that an arc of its toothed circumference is near the rim of the member 10, in line to receive the teeth of the segmental rack 34. A pinion 14 is mounted on a barrel pinion 15 and is positioned away from the circumference of the member 9 to allow for the free passage of the segmental rack 34 when the plate 31 is manually rotated. An escapement wheel 20, mounted on a barrel pinion 19, is time controlled by the balance wheel 23 and equipped with a hair spring, by oscillation of the member 36 equipped with a pin 38 positioned between the fingers of the escapement lever 21, causing the pallets of the escapement lever to regulate the movement of the teeth of the escapement wheel 20.

Although only one pinion is illustrated in the drawings, additional pinions will be necessary in the chain of wheels to regulate the movement of segmental rack 34 across the teeth of the gear 11 to the desired speed. The escapement wheel 20 as regulated by the balance wheel 23, mounted on the barrel pinion 18 is equipped with eight pins, rotates at the speed of ten revolutions a minute, and would engage eighty teeth of the first pinion in one minute. From this formula may be computed the number of pinions intervening between escapement wheel 20 and gear 11 to regulate the revolutionary or circumferential space of the gear 11 to the speed desired for the escapement of the segmental rack 34. A cooking timing device, the purpose of which is to cut off the heat of the cooking element in time intervals up to as long as two hours, will obviously require more or larger pinions 14 than a cooking timing device the purpose of which is to cut off the heat of the cooking element in intervals up to one hour.

Figure 6:
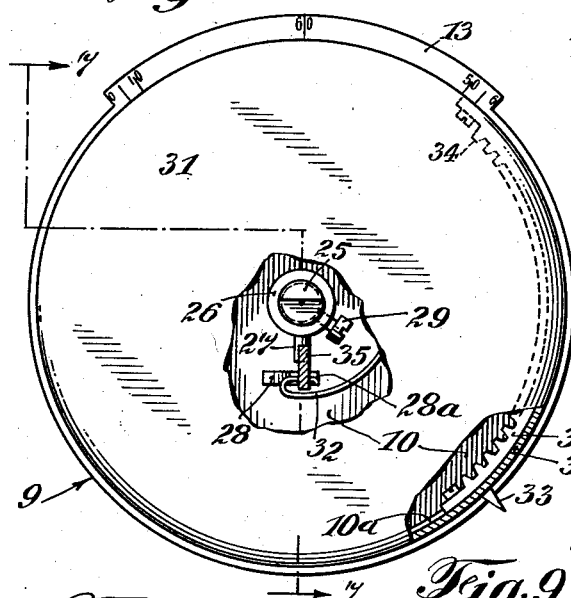
Fig. 6 is a front view partly broken away like Fig. 2 in a position, when the valve is closed.

The attachment of one end of the spring 32 to the post 17 on the member 9 and of the other end to the projection 35 on the plate 31, pulls the spring slidewise out of its natural position when plate 31 is out of engagement position with the member 9 (see Fig. 6), thereby creating a sidewise spring torsion which pulls, and holds the plate 31 into engagement position with the member 9, when the time interval indicator 33 on the plate 31 is manually turned to the desired time interval on the time table 13, and the plate 31 is pushed into engagement with the member 9.

The time table projecting from the upper circumference of member 9, is stamped progressively away from the point of escapement of segmental rack 34 from the gear 11, for the various time intervals which will elapse between the longitudinal point of engagement of segmental rack 34 with the gear 11, until the segmental rack escapes from the gear. Indicator 33, moving along the time table 13 as the plate 31 is manually rotated, indicates the time interval which will elapse until the cooking time device closes the cut off handle of the stove.

Figure 7:
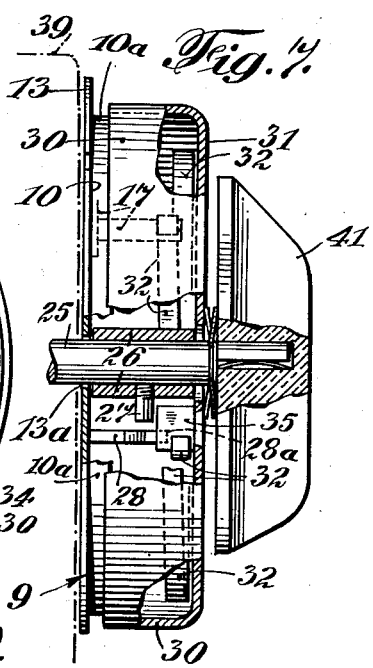
Fig. 7 is a sectional elevation view taken on the line 7—7 of Fig. 6.
Figures 8, 9:
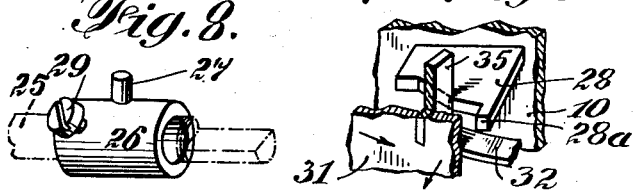
Fig. 8 is a perspective view of the collar and its parts.
Fig. 9 is a perspective view showing means of disengaging the rotary member from the escapement mechanism.

The disengagement trip 28 is affixed to the member 9 in the revolutionary path of the projection 35 on the plate 31 and is positioned on the member 9 so that when the projection strikes and rides up the angular edge of the trip 28 to its projection finger 28a, the projection 35 is forced out of engagement with the projection 27 coincidently with the extinguishment of the heat in the cooking element. This operation moves the plate 31 away from the member 9, (see Fig. 7). The torsion of the spring 32 holds the projection 35 against the projection finger 28a of the trip 28 and thereby holds the plate 31 out of engagement with the radial arm 27 of the collar 26, allowing the cut off handle of the stove to be operated normally without interference from the cooking timing device, until the cooking timing device is set normally for its next operation of time control.

To set the cooking timing device in motion, the plate 31 is manually revolved clockwise until the time indicator 33 is over the desired time interval in the time table 13. This operation stretches or winds the spring 32. The plate 31 is then manually pushed and the segmental rack is thereby moved into engagement with the gear 11 and the tension of the spring rotates the plate 31 in the reverse, or counter-clockwise direction, causing the teeth of segmental rack 34 to rotate the gear 11 which is regulated as to revolutionary speed by the clockwork mechanism, allowing segmental rack 34 to revolve off of the gear 11 in the time interval as indicated by indicator 33 at its start of travel (see Fig. 6). When the segmental rack 34 escapes from the engagement with the gear 11 at the termination of the predetermined time interval, the spring 32 rapidly accelerates the counter-clockwise movement of the plate 31, causing the projection 35 to strike and move radial arm 27 of the collar 26 until the cut off handle of the cooking stove is closed, when the projection 35 rides up the angular edge of disengagement trip 28, and the plate 31 is forced and held out of engagement with the shaft of the cut off handle, permitting resumption of the ordinary manual operation of said cut off handle without interference from the cooking timing device, which is then ready for its next timing operation as described.

Escapement mechanisms may be readily obtained from clock manufacturers at reasonable cost, and the remaining parts of the timing device are made of simple constructions.

I wish it to be understood that I do not desire to be limited to the exact details of constructions shown and described, for obvious modifications will occur to a person skilled in the art.

I claim as my invention:

1. In a cooking timing device for a shaft of a heat control handle for a cooking stove, the combination of a stationary member with a central opening for said shaft, secured to the stove, an escapement mechanism supported by said member including a gear, a scale plate secured to said member, a cupped member, a segmental rack supported within said cupped member at its peripheral portion adapted to engage said gear, a torsion spring having one end secured within and to said stationary member, a projection on said cupped member for holding the other end of said spring, a collar on said shaft, a radial arm on said collar in the path of said spring end projection, an indicating finger on said cupped member, means rotating said cupped member to wind said spring clockwise, to the extent of the desired time to utilize cooking heat, and means moving said cupped member towards the stationary member to engage said rack with said gear at said predetermined position of said finger, whereby said spring unwinds itself anti-clockwise by said rack engaging said gear, for a predetermined time corresponding to the desired cooking, when said spring end projection moves said radial arm of said collar on said shaft to turn off the heating means, and said cupped shaped member moves away from said stationary member, said turning off and on of said heating means being possible independent of said timing device.

2. In a cooking timing device for a shaft of a heat control handle for a cooking stove, the combination of a stationary member with a central opening for said shaft, secured to the stove, an escapement mechanism supported by said member including a gear, a scale plate secured to said member, a cupped member, a segmental rack supported within said cupped member at its peripheral portion adapted to engage said gear, a torsion spring having one end secured within and to said stationary member, a projection on said cupped member for holding the other end of said spring, a collar on said shaft, a radial arm on said collar in the path of said spring end projection, an indicating finger on said cupped member, means rotating said cupped member to wind said spring clockwise, to the extent of the desired time to utilize cooking heat, and means moving said cupped member towards the stationary member to engage said rack with said gear at said predetermined position of said finger, whereby said spring unwinds itself anti-clockwise by said rack engaging said gear, for a predetermined time corresponding to the desired cooking, when said spring end projection moves said radial arm of said collar on said shaft to turn off the heating means, and said cupped shaped member moves away from said stationary member, said turning off and on of said heating means being possible independent of said timing device, the combination with means for opening and closing said shaft to a heating medium, of two substantially parallel members, one rotatable relatively to the other and one shiftable to the other, means engaging said members, when manually shifted towards each other, means rotating one member in respect to the other, in one direction prior to said manual shifting, to a predetermined point, means automatically moving said return member in return rotation automatically until completed, and means at the end of said return rotation for turning off the heating means.

DAVID G. HILL, Jr.

REFERENCES CITED

The following references are of record in the file of this patent:

UNITED STATES PATENTS

| Number | Name | Date |
|---|---|---|
| 967,304 | Bailey | Aug. 16, 1910 |
| 1,865,965 | Ruiz | July 5, 1932 |
| 2,028,630 | Stark | Jan. 21, 1936 |
| 2,478,702 | Moody | Aug. 9, 1949 |